(12) United States Patent
Zhou et al.

(10) Patent No.: US 10,111,026 B2
(45) Date of Patent: Oct. 23, 2018

(54) DETECTING METHOD AND APPARATUS, AND STORAGE MEDIUM

(71) Applicant: Beijing Xiaomi Mobile Software Co., Ltd., Beijing (CN)

(72) Inventors: Shiquan Zhou, Beijing (CN); Qiang Fu, Beijing (CN); Enxing Hou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 127 days.

(21) Appl. No.: 15/346,394

(22) Filed: Nov. 8, 2016

(65) Prior Publication Data

US 2017/0339513 A1    Nov. 23, 2017

(30) Foreign Application Priority Data

May 19, 2016   (CN) .......................... 2016 1 0340568

(51) Int. Cl.
| | |
|---|---|
| *H04W 4/021* | (2018.01) |
| *H04W 4/00* | (2018.01) |
| *H04M 1/725* | (2006.01) |
| *H04W 72/04* | (2009.01) |
| *H04W 4/06* | (2009.01) |

(52) U.S. Cl.
CPC ......... *H04W 4/008* (2013.01); *H04M 1/7253* (2013.01); *H04M 1/72533* (2013.01); *H04W 4/021* (2013.01); *H04W 4/06* (2013.01); *H04W 72/0453* (2013.01)

(58) Field of Classification Search
CPC ........ H04W 4/02; H04W 4/021; H04W 4/008
See application file for complete search history.

(56) References Cited

U.S. PATENT DOCUMENTS

| 8,805,360 | B2 | 8/2014 | Nagaraj | |
|---|---|---|---|---|
| 2009/0036123 | A1* | 2/2009 | Jeon | ...................... H04W 48/16 455/434 |
| 2010/0232401 | A1 | 9/2010 | Hirsch | |
| 2012/0172027 | A1 | 7/2012 | Partheesh et al. | |
| 2013/0210425 | A1 | 8/2013 | Nagaraj | |

(Continued)

FOREIGN PATENT DOCUMENTS

| CN | 103582076 A | 2/2014 |
|---|---|---|
| CN | 103926890 A | 7/2014 |

(Continued)

OTHER PUBLICATIONS

International Search Report and Written Opinion dated Feb. 8, 2017 in PCT/CN2016/093270.

(Continued)

*Primary Examiner* — Tuan H Nguyen
(74) *Attorney, Agent, or Firm* — Oblon, McClelland, Maier & Neustadt, L.L.P.

(57) ABSTRACT

Aspects of the disclosure provide a method for detecting an arrival of a user in a target area. The method includes searching, by a device belonging to the user, for a target wireless access device located in the target area at a preset frequency according to an instruction, when the target wireless access device is found, establishing a connection with the target wireless access device; and after the connection with the target wireless access device is established, determining that the user arrives at the target area.

13 Claims, 11 Drawing Sheets

Searching for a target wireless access device located in a target area at a preset frequency according to an instruction — S11

After the target wireless access device is searched out, establishing a connection therewith — S12

After the connection with the target wireless access device is established, determining that a user arrives at the target area — S13

(56) References Cited

U.S. PATENT DOCUMENTS

| | | | |
|---|---|---|---|
| 2013/0309971 A1* | 11/2013 | Kiukkonen | H04L 63/107 455/41.2 |
| 2014/0045430 A1* | 2/2014 | Kim | H04B 7/26 455/41.2 |
| 2014/0269491 A1 | 9/2014 | Edge | |
| 2014/0342733 A1 | 11/2014 | Nagaraj | |
| 2015/0140994 A1 | 5/2015 | Partheesh et al. | |
| 2015/0195100 A1 | 7/2015 | Imes et al. | |
| 2015/0358902 A1 | 12/2015 | Edge | |
| 2016/0269858 A1 | 9/2016 | Nagaraj | |

FOREIGN PATENT DOCUMENTS

| | | |
|---|---|---|
| CN | 103595857 A | 12/2014 |
| CN | 104363590 A | 2/2015 |
| CN | 105009645 A | 10/2015 |
| CN | 105101085 A | 11/2015 |
| CN | 105228224 A | 1/2016 |
| CN | 105828294 A | 8/2016 |
| EP | 2 665 237 A1 | 11/2013 |

OTHER PUBLICATIONS

Extended European Search Report dated Mar. 31, 2017 in Patent Application No. 16192473.3.
Office Action dated Dec. 25, 2017, in Chinese Patent Application No. 201610340568.7.

\* cited by examiner

DETECTING METHOD AND APPARATUS, AND STORAGE MEDIUM

CROSS-REFERENCE TO RELATED APPLICATION

This application is based on and claims the priority of the Chinese patent application No. 201610340568.7, filed on May 19, 2016, which is incorporated herein by reference in its entirety.

TECHNICAL FIELD

The present disclosure is related to the field of smart electrical appliance technology, and more particularly, to a detecting method and apparatus, and a storage medium.

BACKGROUND

As an embodiment of interconnection of things via Internet, smart electrical appliance technology connects various devices (such as audio and video devices, illuminating systems, curtain controllers, security systems, digital theatre systems, movie and music servers, movie cabinet systems, network electrical appliances and the like) in an area together through the Internet of Things technology, in order to control those devices smartly.

One application scenario of the smart electrical appliance technology is to perform smart control (for example, turning on an air conditioner, etc.) according to a user' arrival at a target area. Therefore, it is crucial to detect whether the user arrives at the target area.

SUMMARY

Aspects of the disclosure provide a method for detecting an arrival of a user in a target area. The method includes searching, by a device belonging to the user, for a target wireless access device located in the target area at a preset frequency according to an instruction, when the target wireless access device is found, establishing a connection with the target wireless access device; and after the connection with the target wireless access device is established, determining that the user arrives at the target area.

To search for the target wireless access device located in the target area at the preset frequency according to the instruction, in an embodiment, the method includes detecting that the user is within a proximity to the target area, and searching for the target wireless access device at the preset frequency when the user is within the proximity to the target area.

In another embodiment, the method includes detecting that the user is with a proximity to the target area, prompting the user when the user is within the proximity to the target area, receiving an instruction to search for the target wireless access device, and searching for the target wireless access device at the preset frequency.

In an example, the method includes detecting that the user is with a proximity to the target area, prompting the user to perform an activation operation associated with an instruction to search for the target wireless access device when the user is within the proximity to the target area, detecting the activation operation performed on the device, and searching for the target wireless access device at the preset frequency.

To detect that the user is within the proximity to the target area, in an embodiment, the method includes detecting a wireless access device; and when the detected wireless access device is in a pre-stored list of wireless access devices near the target area, determining that the user is within the proximity to the target area.

In another embodiment, the method includes detecting a wireless access device; and when the detected wireless access device is in a pre-stored list of wireless access devices near the target area, determining that the user is within the proximity to the target area.

In another embodiment, the method includes sending a broadcast message according to a Bluetooth wireless communication standard; and when a response message from a Bluetooth device near the target area is received in response to the broadcast message, determining that the user is within the proximity to the target area.

In another embodiment, the method includes acquiring the user's position; determining a distance between the user's position and a pre-stored position of the target area; and when the distance between the user's position and the pre-stored position of the target area is smaller than a predetermined distance, determining that the user is within the proximity to the target area.

In an example, after determining that the user arrives at the target area, the method further includes performing an operation preset for the user's arrival at the target area.

Aspects of the disclosure provide a detecting apparatus. The detecting apparatus includes a processor; and a memory configured to store instructions executable by the processor. The processor is configured to search for a target wireless access device located in a target area at a preset frequency according to an instruction, when the target wireless access device is found, establish a connection with the target wireless access device; and after the connection with the target wireless access device is established, determine that a user who owns the detecting apparatus arrives at the target area.

Aspects of the disclosure provide a non-transitory computer-readable storage medium having stored therein instructions that, when executed by a processor of a mobile terminal, cause the mobile terminal to perform operations for detecting an arrival of a user who owns the mobile terminal in a target area. The operations include searching for a target wireless access device located in the target area at a preset frequency according to an instruction; when the target wireless access device is found, establishing a connection with the target wireless access device; and after the connection with the target wireless access device is established, determining that the user arrives at the target area.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise indicated. The implementations set forth in the following description of exemplary embodiments do not represent all implementations consistent with the disclosure. Instead, they are merely examples of apparatuses and methods consistent with aspects related to the disclosure as recited in the appended claims.

As an embodiment of interconnection of things via Internet, smart electrical appliance technology connects various devices (such as audio and video devices, illuminating systems, curtain controllers, security systems, digital theatre systems, movie and music servers, movie cabinet systems, network electrical appliances and the like) in an area together through the Internet of Things technology, in order to control those devices smartly. One application scenario of the smart electrical appliance technology is to perform smart control (for example, turning on an air conditioner, etc.) according to a user's arrival at a target area. Therefore, it is crucial to detect whether the user arrives at the target area. If the detection of the user's arrival at the target area is not accurate, performance of related operations by the smart electrical appliances will be affected. According to the technical solution of embodiments of this disclosure, by searching for a wireless access device located in a target area at a preset frequency, the wireless access device in the target area can be searched out and a communication connection therewith can be established in time. Once the connection is established successfully, it is determined that the user arrives at the target area, so that the user's arrival at the target area can be detected more accurately.

In the embodiments of this disclosure, the target area is a specific area, which may be a residence, an office area or the like in different embodiments. The wireless access device located in the target area may be a device providing wireless network communication services for the target area, such as a wireless router, a wireless access point (AP) or the like.

Embodiment 1

Figure 1:
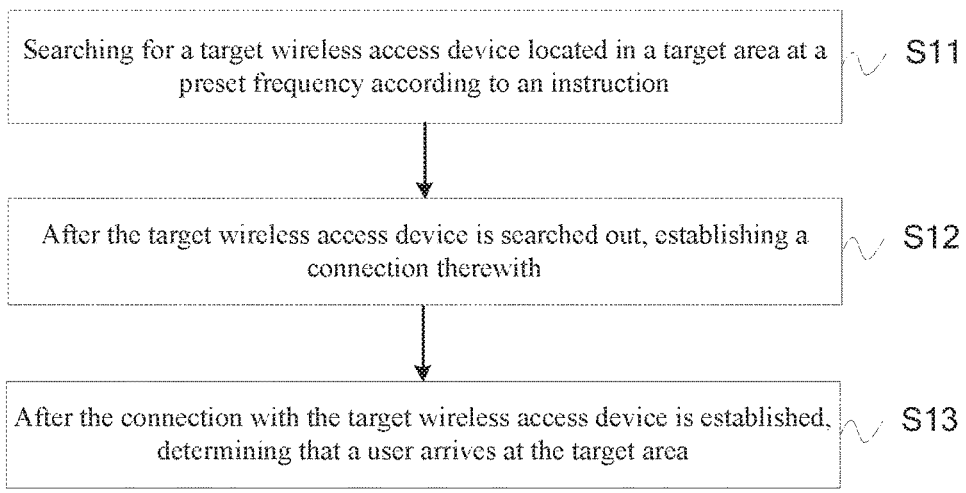
FIG. 1 is a flow chart showing a first detecting method according to an exemplary embodiment 1.

FIG. 1 is a flow chart showing a detecting method according to an exemplary embodiment. As shown in FIG. 1, the method may be applied to a portable device (such as a handset, a tablet computer, a wearable device or the like) having a wireless communication function or to an application in the portable device, and comprises steps S11-S13 as below.

In step S11, a target wireless access device located in a target area is searched for at a preset frequency according to an instruction.

In one embodiment, the preset frequency is higher than a frequency of switching a screen to a sleeping state (that is, a power-off state of the screen). For example, in order to search out a target wireless access device in time, the preset frequency may be 20 or 30 times per minute, and may be changed by modifying the settings.

In one embodiment, a searching duration for searching for the target wireless access device at the preset frequency may be set. The searching frequency may be changed based on the searching duration. For example, the searching frequency may be reduced as the searching duration increases.

In one embodiment, the target wireless access device may be determined according to pre-settings, and a name of the target wireless access device may be stored.

In one embodiment, the target wireless access device may be a device having a wireless access function, such as a router, a wireless AP, a hot spot, etc.

In step S12, after the target wireless access device is searched out, a connection therewith is established.

In one embodiment, an access password for the target wireless access device may be stored. After the target wireless access device is searched out, the target wireless access device is automatically connected to using the stored access password for the target wireless access device.

In step S13, after the connection with the target wireless access device is established, it is determined that a user arrives at the target area.

In one embodiment, after the connection with the target wireless access device is established successfully, a prompt indicating the successful connection may be sent out.

According to the above method provided by this embodiment of the present disclosure, by searching for a wireless access device located in a target area at a preset frequency and by determining that a user arrives at the target area after establishing a connection with the wireless access device in the target area searched out, the target wireless access device can be searched out and a communication connection therewith can be established in time. Once the connection is established successfully, it is determined that the user arrives at the target area, so that the user's arrival at the target area can be detected more accurately.

In one embodiment, in S11, the target wireless access device may be searched for at the preset frequency, when it is detected that the user is about to arrive at the target area.

According to the above method provided by this embodiment of the present disclosure, by activating continuous searching for the target wireless access device after detecting that the user is about to arrive at the target area, the target wireless access device can be searched out in a timely manner.

Figure 2:
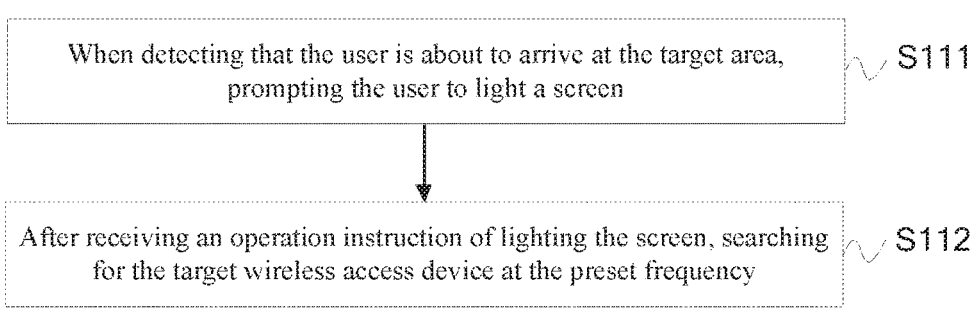
FIG. 2 is a flow chart showing a second detecting method according to the exemplary embodiment 1.

In one embodiment, as shown in FIG. 2, step S11 may comprise steps S111 and S112.

In step S111, when it is detected that the user is about to arrive at the target area, the user is prompted to light a screen.

In one embodiment, the user may be prompted to light the screen in a default prompting manner, such as via a voice prompt, a vibration prompt or the like. In one embodiment, the user may be prompted to light the screen in a user-defined prompting manner, such as via a voice prompt, a vibration prompt or the like.

In step S112, after an operation instruction of lighting the screen is received, the target wireless access device is search for at the preset frequency.

In the embodiment of this disclosure, various manners may be adopted to detect that the user is about to arrive at the target area, and the specific detecting manner is not limited herein.

According to the above method provided by this embodiment of the present disclosure, by lighting the screen, searching for the target wireless access device at the preset frequency can be activated conveniently.

Figure 3:
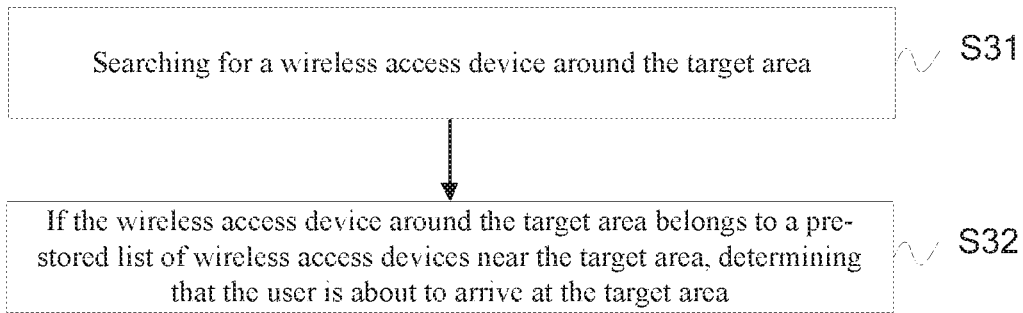
FIG. 3 is a flow chart showing a first method for detecting that a user is about to arrive at a target area according to the exemplary embodiment 1.

In one embodiment, for detecting that the user is about to arrive at the target area, the step S11 may comprise steps S31 and S32 as shown in FIG. 3.

In step S31, a wireless access device around the target area is searched for.

For example, the wireless access device around the target area may be searched for intermittently at a fixed frequency.

In step S32, if the wireless access device around the target area belongs to a pre-stored list of wireless access devices near the target area, it is determined that the user is about to arrive at the target area.

In one embodiment, before step S32, wireless access devices near the target area (for example, the user's home) may be searched for, the names of the searched out wireless access devices near the home may be stored in a list of wireless access devices around the target area, so that the list of wireless access devices around the home is created.

According to the above method provided by this embodiment of the present disclosure, by searching for the wireless access device around the target area to determine that the user is about to arrive the target area, searching for the target wireless access device at the preset frequency after determining that the user is about to arrive at the target area, and determining that the user arrives at the target area after establishing a connection with the target wireless access device searched out, the user's arrival at the target area can be detected more accurately.

Figure 4:
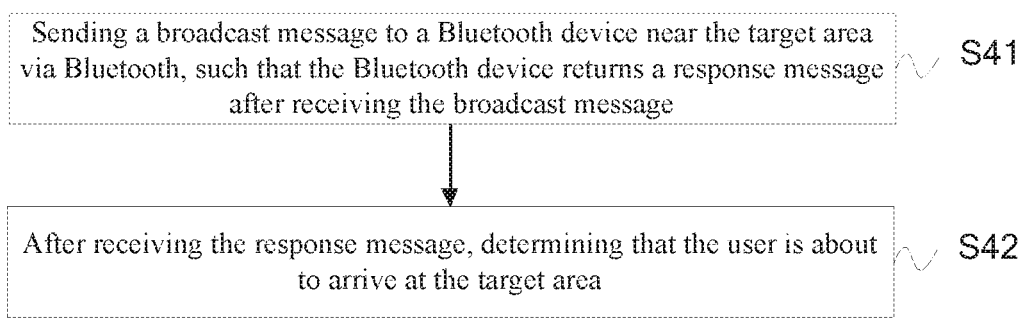
FIG. 4 is a flow chart showing a second method for detecting that a user is about to arrive at a target area according to the exemplary embodiment 1.

In one embodiment, for detecting that the user is about to arrive at the target area, the step S111 may comprise steps S41 and S42 as shown in FIG. 4.

In step S41, a broadcast message is sent to a Bluetooth device around the target area via Bluetooth, such that the Bluetooth device returns a response message after receiving the broadcast message.

In one embodiment, an identification of a Bluetooth device near the target area may be recorded in advance. After receiving a broadcast message, the Bluetooth device near the target area returns a response message carrying the identification of the Bluetooth device, so that the Bluetooth device around the target area may be identified based on the identification.

A Bluetooth device near the target area may be one located within a certain distance (e.g., 50 meters) from the target area. For example, when the target area is a residence, the Bluetooth device around the target area may be provided at a location by which the user will pass when going back to his/her residence, such as near the gate of a community where the residence is located or near the gate of a building where the residence is located.

In step S42, after the response message is received, it is determined that the user is about to arrive at the target area.

According to the above method provided by this embodiment of the present disclosure, by determining that the user is about to arrive at the target area through a Bluetooth device near the target area, activating continuous searching for the target wireless access device after determining that the user is about to arrive at the target area, and determining that the user arrives at the target area after establishing a connection with the target wireless access device searched out, the user's arrival at the target area can be detected more accurately.

Figure 5:
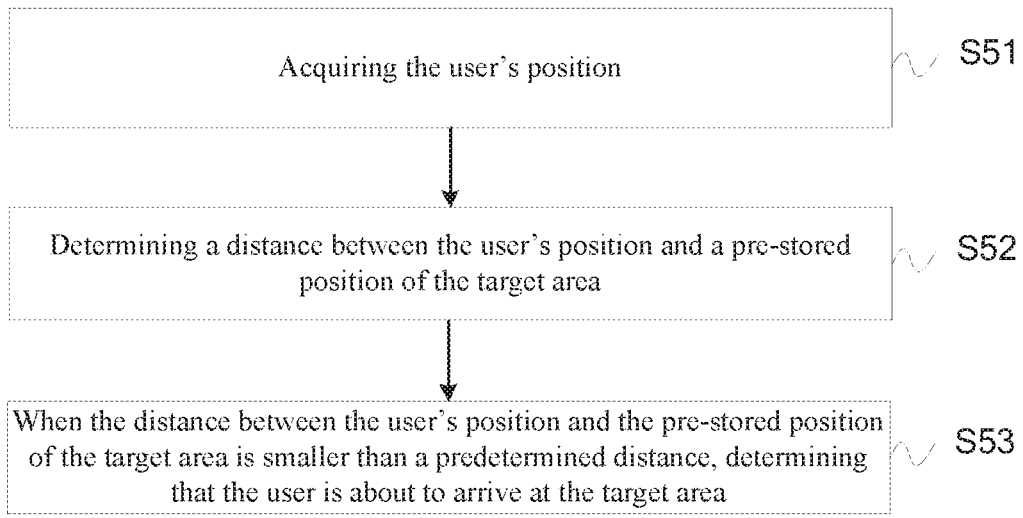
FIG. 5 is a flow chart showing a third method for detecting that a user is about to arrive at a target area according to the exemplary embodiment 1.

In one embodiment, for detecting that the user is about to arrive at the target area, step S111 may comprise steps S51-S53 as shown in FIG. 5.

In step S51, the user's position is acquired.

In one embodiment, the user's position may be acquired by a positioning module carried with the user. The user's position may be acquired in real time or periodically.

In step S52, a distance between the user's position and a pre-stored position of the target area is determined.

In one embodiment, the position of the target area is pre-stored. As such, after acquiring the user's position, the distance between the user's position and the pre-stored position of the target area can be determined.

In step S53, when the distance between the user's position and the pre-stored position of the target area is smaller than a predetermined distance, it is determined that the user is about to arrive at the target area.

In one embodiment, the distance between the user's position and the pre-stored position of the target area may be preset, for example, as 50 meters, 100 meters or the like.

According to the above method provided by this embodiment of the present disclosure, by determining that the user is about to arrive at the target area based on a distance between the user's position and a pre-stored position of the target area, activating continuous searching for a target wireless access device after determining that the user is about to arrive at the target area, and determining that the user arrives at the target area after establishing a connection with the searched out target wireless router, the user's arrival at the target area can be detected more accurately.

Figure 6:
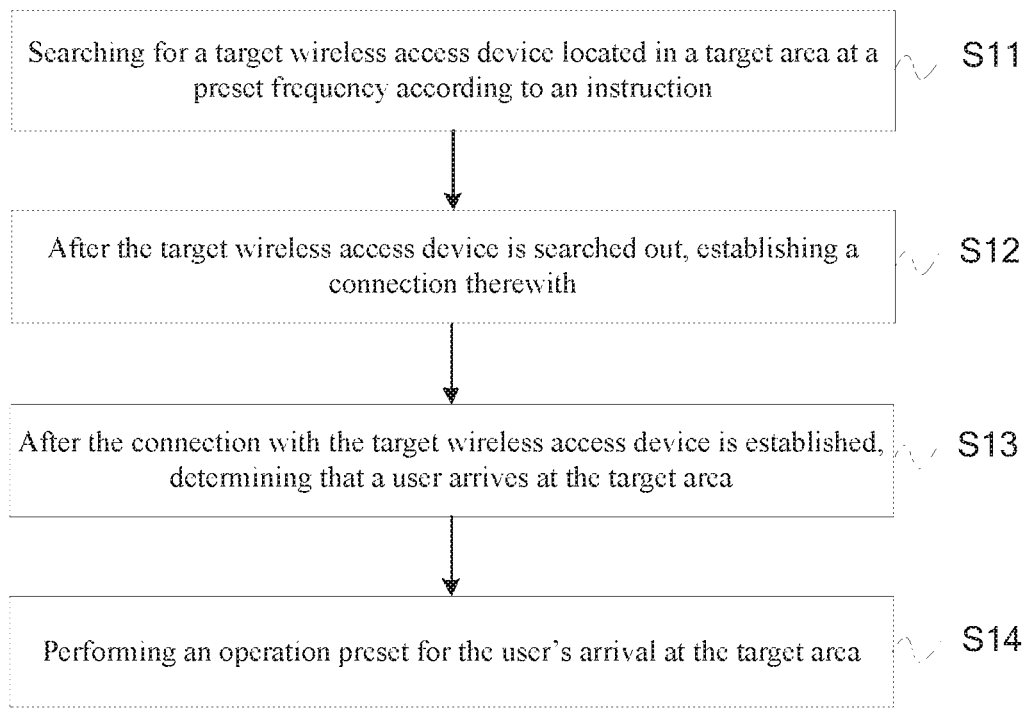
FIG. 6 is a flow chart showing a third detecting method according to the exemplary embodiment 1.

In one embodiment, as shown in FIG. 6, after step S13, the method further comprises S14, at which an operation preset for the user's arrival at the target area is performed.

In the embodiment of this disclosure, the operation preset for the user's arrival at the target area may include various operations, such as turning on an air conditioner, turning on a water heater or the like.

According to the above method provided by this embodiment of the present disclosure, after accurately determining that the user arrives at the target area, an operation preset for the user's arrival at the target area is performed, so that the user experience can be enhanced.

According to the above methods provided by the embodiments of the present disclosure, by searching for a target wireless access device at a preset frequency, establishing a connection with the target wireless access device searched out, and determining that a user arrives at the target area after establishing the connection, the target wireless access device can be searched out and a communication connection therewith can be established in time. Once the connection is established successfully, it is determined that the user arrives at the target area, so that the user's arrival at the target area can be detected more accurately.

Embodiment 2

The present embodiment describes in detail an application scenario in which the above method in embodiment 1 is implemented. In this application scenario, the method in embodiment 1 is applied to a handset, the target wireless access device is a wireless router in a home, the handset activates searching for the wireless router in the home when the user is about to arrive home, and it is determined that the user arrives home after a connection between the handset and the wireless router in the home is established.

Figure 7:
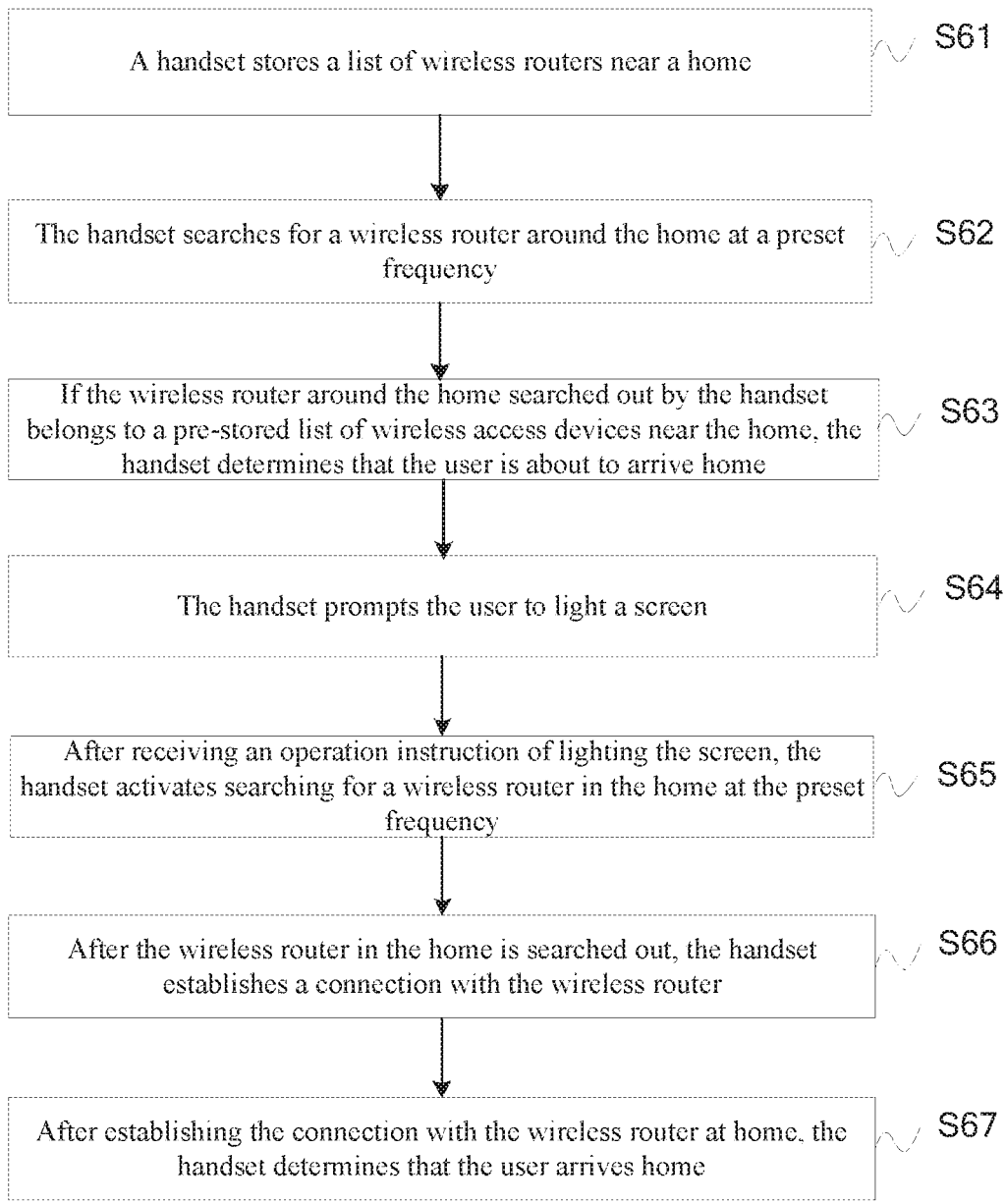
FIG. 7 is a flow chart showing a detecting method according to an exemplary embodiment 2.

As shown in FIG. 7, a method for detecting that the user arrives home according to the embodiment comprises steps S61-S67.

In step S61, the handset stores a list of wireless routers near the home.

The list of wireless routers near the home stores the name of at least one wireless router.

For example, to create a list of wireless routers near the home, the handset searches for wireless routers near the home, and stores names of the wireless routers near the home searched out in the list of wireless routers near the home.

In step S62, the handset searches for a wireless router around the home at a preset frequency.

For example, the frequency may be preset according to different scenarios. For example, the preset frequency may be 30 or 40 times per minute.

In step S63, if the wireless router around the home searched out by the handset belongs to a pre-stored list of wireless access devices near the home, it is determined that the user is about to arrive home.

For example, based on an overlapping degree between wireless routers around the home searched out by the handset and the devices in the pre-stored list of wireless access devices near the home, a conclusion may be obtained that the user is about to arrive home. For example, the higher the overlapping degree is, the more accurately it can determined that the user is about to arrive home. In one embodiment, a specific condition may be set. For example, if at least two wireless routers around the home searched out by the handset belong to the pre-stored list of wireless access devices near the home, it is determined that the user is about to arrive home.

In step S64, the handset prompts the user to light a screen.

In one embodiment, the user may be prompted to light the screen in a default prompting manner, such as via a voice prompt, a vibration prompt or the like. In one embodiment, the user may be prompted to light the screen in user-defined prompting manner, such as via a voice prompt, a vibration prompt or the like.

In step S65, after receiving an operation instruction of lighting the screen, the handset searches for a wireless router in the home at a preset frequency.

In one embodiment, after determining that the user is about to arrive home, continuous searching for the wireless router in the home may be activated automatically without prompting the user.

In step S66, after searching out the wireless router in the home, the handset establishes a connection with the wireless router.

In one embodiment, an access password for the wireless router in the home may be pre-stored. After the wireless router is searched out, the wireless router is connected to using the pre-stored access password.

In step S67, after establishing the connection with the wireless router in the home, the handset determines that the user arrives home.

In the embodiments of this disclosure, after determining that the user arrives home, an operation preset for the user's arrival home may be performed. The operation preset for the user arrival home may include various operations, such as turning on an air conditioner, turning on a water heater or the like.

It should be noted that the present embodiment is described only by taking an example in which the method is performed by a handset and the wireless access device in the home is a wireless router in the home. Referring to the above steps of this embodiment, the method of this embodiment may be also applied to other devices (such as wearable devices), and the wireless access device in the home may be an AP in the home.

According to the above method provided by this embodiment of the present disclosure, a handset determines that a user is about to arrive home based on a wireless router around a home, searches for the wireless router in the home at a preset frequency after determining that the user is about to arrive home, and determines that the user arrives home after establishing a connection with the wireless router in the home searched out. As such, the wireless router in the home can be searched out and a communication connection therewith can be established in time. Once the connection is established successfully, it is determined that the user arrives home, so that the user's arrival home can be detected more accurately.

Embodiment 3

The present embodiment describes in detail an application scenario in which the above method in embodiment 1 is implemented. In this application scenario, the method provided in embodiment 1 is applied to a handset, the target wireless access device is a wireless router in a home, the handset activates searching for the wireless router in the home when the user is about to arrive home, and it is determined that the user arrives home after a connection between the handset and the wireless router is established.

Figure 8:
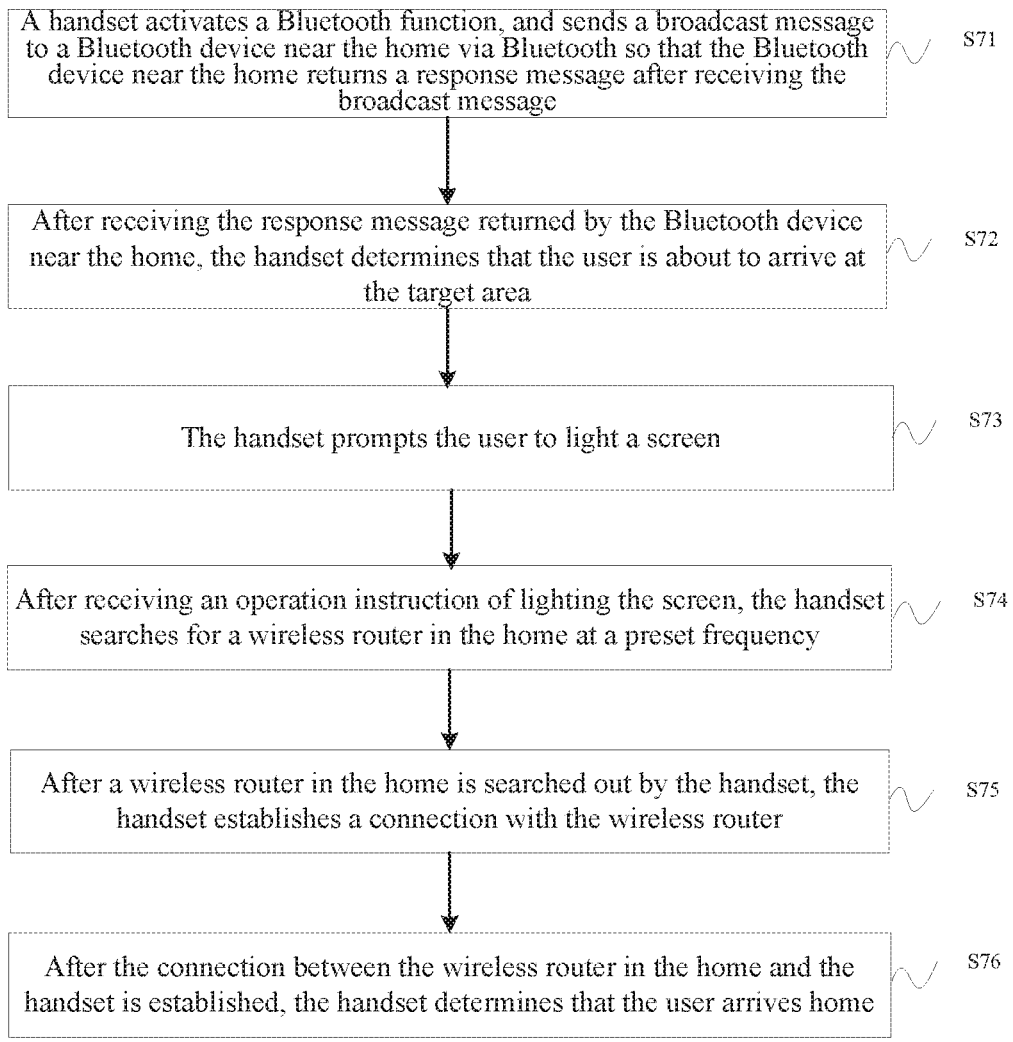
FIG. 8 is a flow chart showing a detecting method according to an exemplary embodiment 3.

As shown in FIG. 8, a method for detecting that the user arrives home according to the embodiment comprises steps S71-S76.

In step S71, a Bluetooth function is activated, and a broadcast message is sent to a Bluetooth device near the home via Bluetooth so that the Bluetooth device near the home returns a response message after receiving the broadcast message.

In one embodiment, the broadcast message may be sent to the Bluetooth device near the home in real time or periodically.

In one embodiment, the identification of the Bluetooth device near the target area may be recorded in advance. After receiving the broadcasting message, the Bluetooth device near the home returns a response message carrying the identification of the Bluetooth device, so that the Bluetooth device near the home may be identified based on the identification.

A Bluetooth device near the home may be one located within a certain distance (e.g., 50 meters) from the home. In one embodiment, the Bluetooth device near the home may be provided at a location by which the user will pass when going back to his/her home, such as near the gate of a community where the home is located or near the gate of a building where the home is located.

In step S72, after receiving the response message returned by the Bluetooth devices around the home, it is determined that the user is about to arrive at the home.

In step S73, the handset prompts the user to light a screen.

In one embodiment, the user may be prompted to light a screen in a default prompting manner, such as via a voice prompt, a vibration prompt or the like. In one embodiment, the user may be prompted to light a screen in a user-defined prompting manner, such as via a voice prompt, a vibration prompt or the like.

In step S74, after receiving an operation instruction of lighting the screen, the handset searches for a wireless router in the home at a preset frequency.

In one embodiment, after determining that the user is about to arrive home, continuous searching for the wireless router in the home may be activated automatically without prompting the user.

In step S75, after a wireless router in the home is searched out by the handset, the handset establishes a connection with the wireless router.

In one embodiment, an access password for the wireless router in the home may be pre-stored. After the wireless router is searched out, the wireless router is connected to using the pre-stored access password.

In step S76, after the connection between the wireless router in the home and the handset is established, the handset determines that the user arrives home.

In the embodiment of this disclosure, after determining that the user arrives home, an operation preset for the user's arrival home may be performed. The operation preset for the user's arrival home may include various operations, such as turning on an air conditioner, turning on a water heater or the like.

It should be noted that the present embodiment is described only by taking an example in which the method is performed by a handset and the target wireless access device is a wireless router in the home. Referring to the above steps of this embodiment, the method of this embodiment may be also applied to other devices (such as wearable devices), and the target wireless access device may be an AP in the home.

According to the above method provided by this embodiment of the present disclosure, a handset activates searching for a wireless router in the home at a preset frequency after determining that a user is about to arrive home based on a Bluetooth device near the home, and determining that the user arrives home after establishing a connection with the wireless router in the home searched out. As such, the wireless router in the home can be searched out and a communication connection therewith can be established in time. Once the connection is established successfully, it is determined that the user arrives home, so that the user's arrival home can be detected more accurately.

Embodiment 4

The present embodiment describes in detail an application scenario in which the above method in embodiment 1 is implemented. In this application scenario, the method in embodiment 1 is applied to a handset, the target wireless access device is a wireless router in a home, the handset activates continuous searching for the wireless router in the home when the user is about to arrive home, and it is determined that the user arrives home after a connection between the handset and the wireless router in the home is established.

Figure 9:
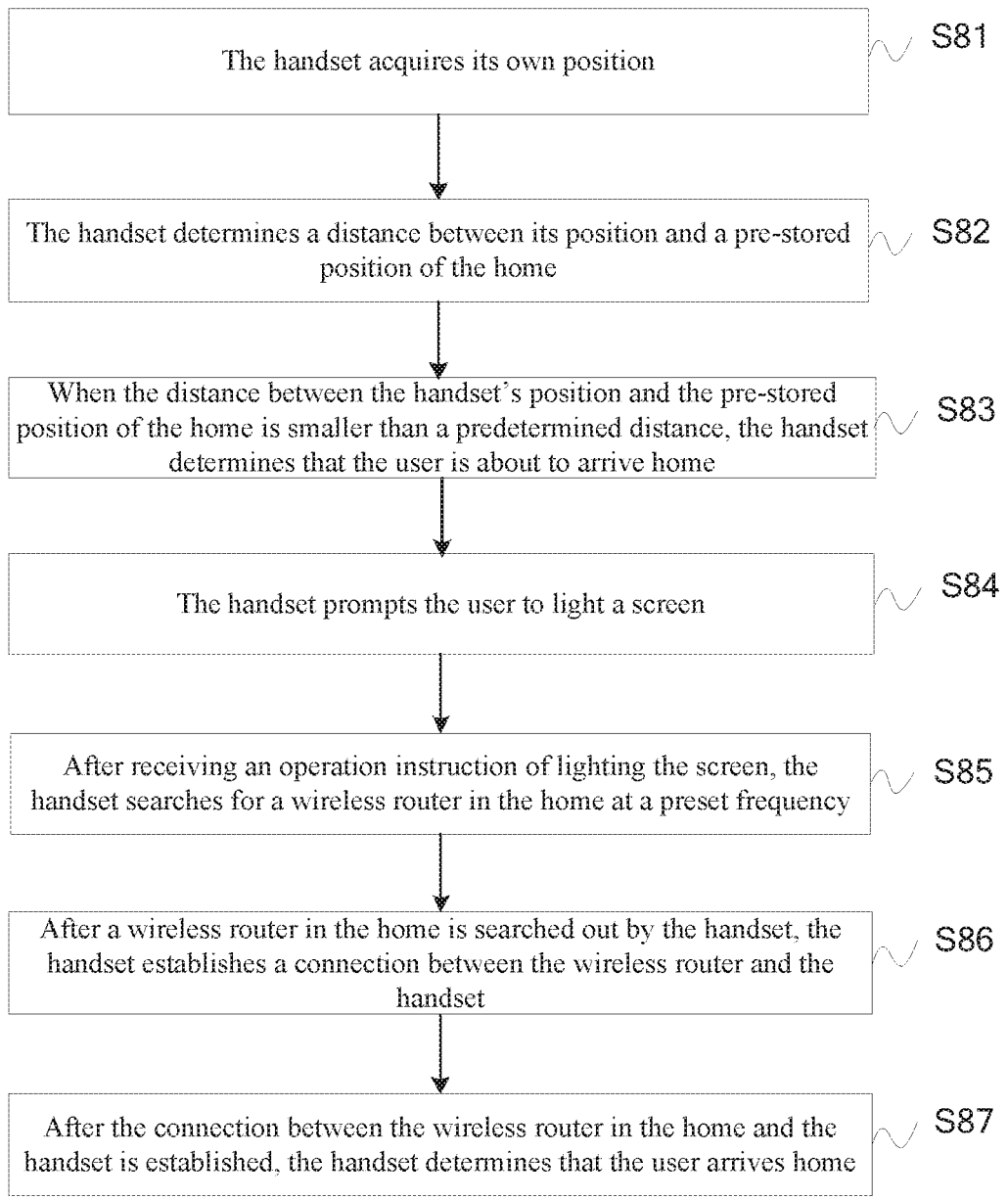
FIG. 9 is a flow chart showing a detecting method according to an exemplary embodiment 4.

As shown in FIG. 9, a method for detecting that the user arrives home according to the embodiment comprises steps S81-S87.

In step S81, the handset acquires its own position.

In one embodiment, the handset may acquire its own position by self-positioning. The position may be acquired in real time or periodically.

In step S82, the handset determines a distance between its own position and a pre-stored home position.

In step S83, when the distance between the handset's position and the pre-stored home position is smaller than a predetermined distance, the handset may determine that the user is about to arrive home.

The preset distance may be as 100 meters or 200 meters, for example.

In step S84, the handset prompts the user to light a screen.

In one embodiment, the user may be prompted to light a screen in a default prompting manner, such as via a voice prompt, a vibration prompt or the like. In one embodiment, the user may be prompted to light a screen in a user-defined prompting manner, such as via a voice prompt, a vibration prompt or the like.

In step S85, after receiving an operation instruction of lighting the screen, the handset activates searching for a wireless router in the home at a preset frequency.

In one embodiment, after determining that the user is about to arrive home, the handset may activate continuous searching for the wireless routers in the home automatically without prompting the user.

In step S86, after searching out a wireless router in the home, the handset establishes a connection with the wireless router.

In one embodiment, an access password for the wireless router in the home may be pre-stored. After the wireless router is searched out, the wireless router is connected to using the pre-stored access password.

In Step S87, after establishing the connection with the wireless router in the home, the handset determines that the user arrives home.

In the embodiment of this disclosure, after determining that the user arrives home, an operation preset for the user's arrival home may be performed. The operation preset for the user's arrival home may include various operations, such as turning on an air conditioner, turning on a water heater or the like.

It should be noted that the present embodiment is described only by taking an example in which the method is performed by a handset and the target wireless access device is a wireless router in the home. Referring to the above steps of this embodiment, the method of this embodiment may be also applied to other devices (such as wearable devices), and the target wireless access device may be an AP in the home.

According to the above method provided by this embodiment of the present disclosure, a handset activates searching for a wireless router in a home at a preset frequency after determining that a user is about to arrive home based on a distance between the user's position and a preset position of the home, and determines that the user arrives home after establishing a connection with the wireless router in the home searched out. As such, the wireless router in the home can be searched out and a communication connection therewith can be established in time. Once the connection is established successfully, it is determined that the user arrives home, so that the user's arrival home can be detected more accurately.

Embodiment 5

Figure 10:
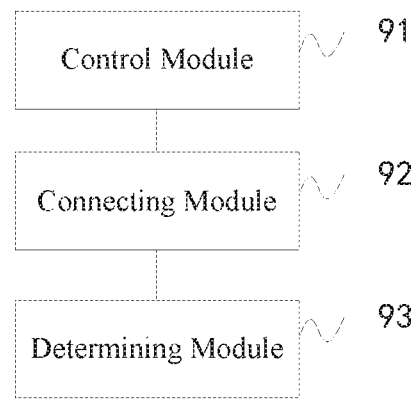
FIG. 10 is a block diagram illustrating a first detecting apparatus according to an exemplary embodiment 5.

FIG. 10 is a block diagram illustrating a detecting apparatus according to an exemplary embodiment. The detecting apparatus comprises: a control module 91 configured to activate continuous searching for a target wireless access device; a connecting module 92 configured to, after the target wireless access device is searched out by the control module 91, establish a connection with the target wireless access device; and a determining module 93 configured to, after the connection with the target wireless access device is established by the connecting module 92, determine that a user arrives home.

Figure 11:
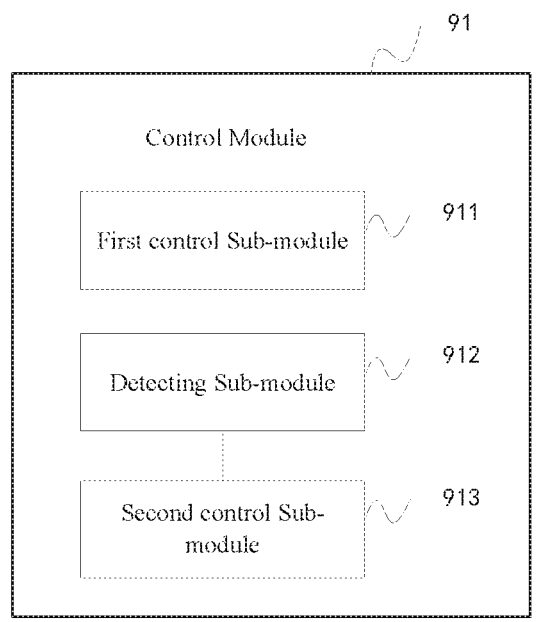
FIG. 11 is a block diagram illustrating a second detecting apparatus according to the exemplary embodiment 5.

In one embodiment, as shown in FIG. 11, the control module 91 comprises: a first control sub-module 911 configured to, when it is detected that the user is about to arrive home, activate continuous searching for the target wireless access device.

In one embodiment, as shown in FIG. 11, the control module 91 comprises: a detecting sub-module 912 configured to, when detecting that the user is about to arrive home, give the user a prompt of lighting a screen so as to prompt the user to light the screen; and a second control sub-module 913 configured to, after an operation instruction of lighting the screen is received, activate continuous searching for the target wireless access device.

Figure 12:
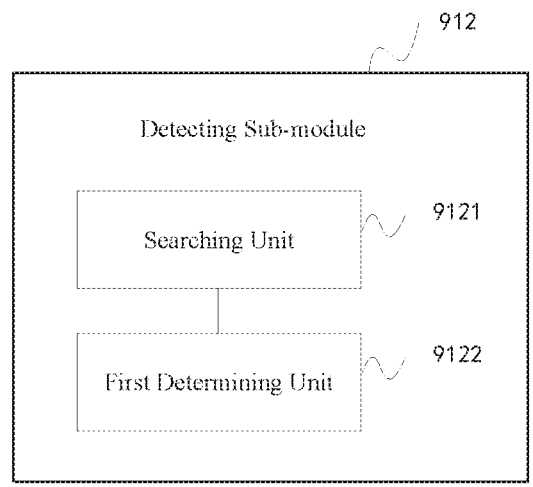
FIG. 12 is a block diagram illustrating a third detecting apparatus according to the exemplary embodiment 5.

In one embodiment, as shown in FIG. 12, the detecting sub-module 912 comprises: a searching unit 9121 configured to search for a wireless access device around the target area; and a first determining unit 9122 configured to, if the wireless access device around the target area belongs to a pre-stored list of wireless access devices near the target area, determine that the user is about to arrive at the target area.

Figure 13:
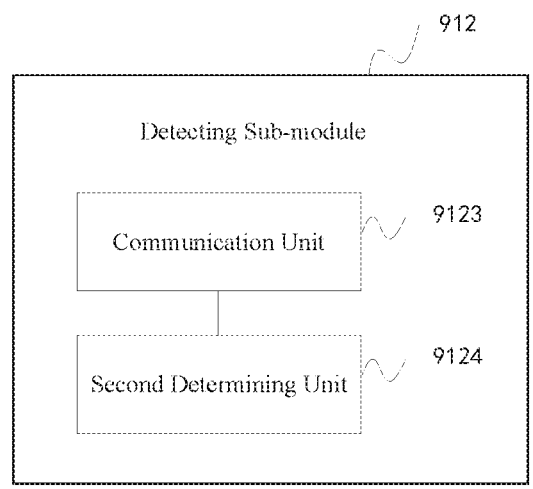
FIG. 13 is a block diagram illustrating a fourth detecting apparatus according to the exemplary embodiment 5.

In one embodiment, as shown in FIG. 13, the detecting sub-module 912 comprises: a communication unit 9123 configured to send a broadcast message to a Bluetooth device near the target area via Bluetooth, such that the Bluetooth device near the target area returns a response message after receiving the broadcast message; and a second determining unit 9124 configured to, after the communication unit receives the response message returned by the Bluetooth device near the target area, determine that the user is about to arrive at the target area.

Figure 14:
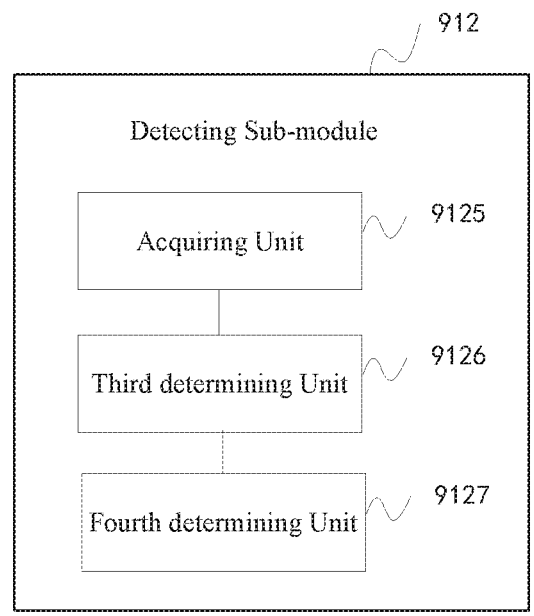
FIG. 14 is a block diagram illustrating a fifth detecting apparatus according to the exemplary embodiment 5.

In one embodiment, as shown in FIG. 14, the detecting sub-module 912 comprises: an acquiring unit 9125 configured to acquire the user's position; a third determining unit 9126 configured to, determine a distance between the user's position and a pre-stored position of the target area; a fourth determining unit 9127 configured to, when the distance between the user's position and the pre-stored position of the target area is smaller than a predetermined distance, determine that the user is about to arrive at the target area.

Figure 15:
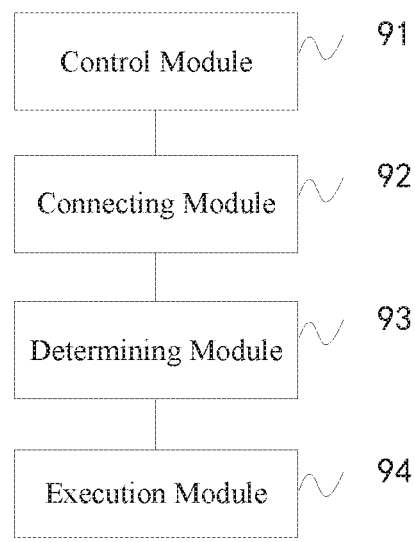
FIG. 15 is a block diagram illustrating a sixth detecting apparatus according to the exemplary embodiment 5.

In one embodiment, as shown in FIG. 15, the detecting apparatus for detecting the user's arrival home further comprises: an execution module 94 configured to perform an operation preset for the user's arrival at the target area, after the determining module determines that the user arrives at the target area.

With respect to the apparatus in the above embodiments, the specific manners for performing operations in individual modules therein have been described in detail in the embodiments regarding the related methods and will not be elaborated herein.

The apparatus provided by this embodiment of the present disclosure may produce the following advantageous effect. By searching for a target wireless access device in a user's home at a preset frequency and by determining that a user arrives home after establishing a connection with the target wireless access device in the user's home searched out, the target wireless access device can be searched out in time and a communication connection therewith can be established. Once the connection is established successfully, it is determined that the user arrives home, so that the user's arrival home can be detected more accurately.

Embodiment 6

Figure 16:
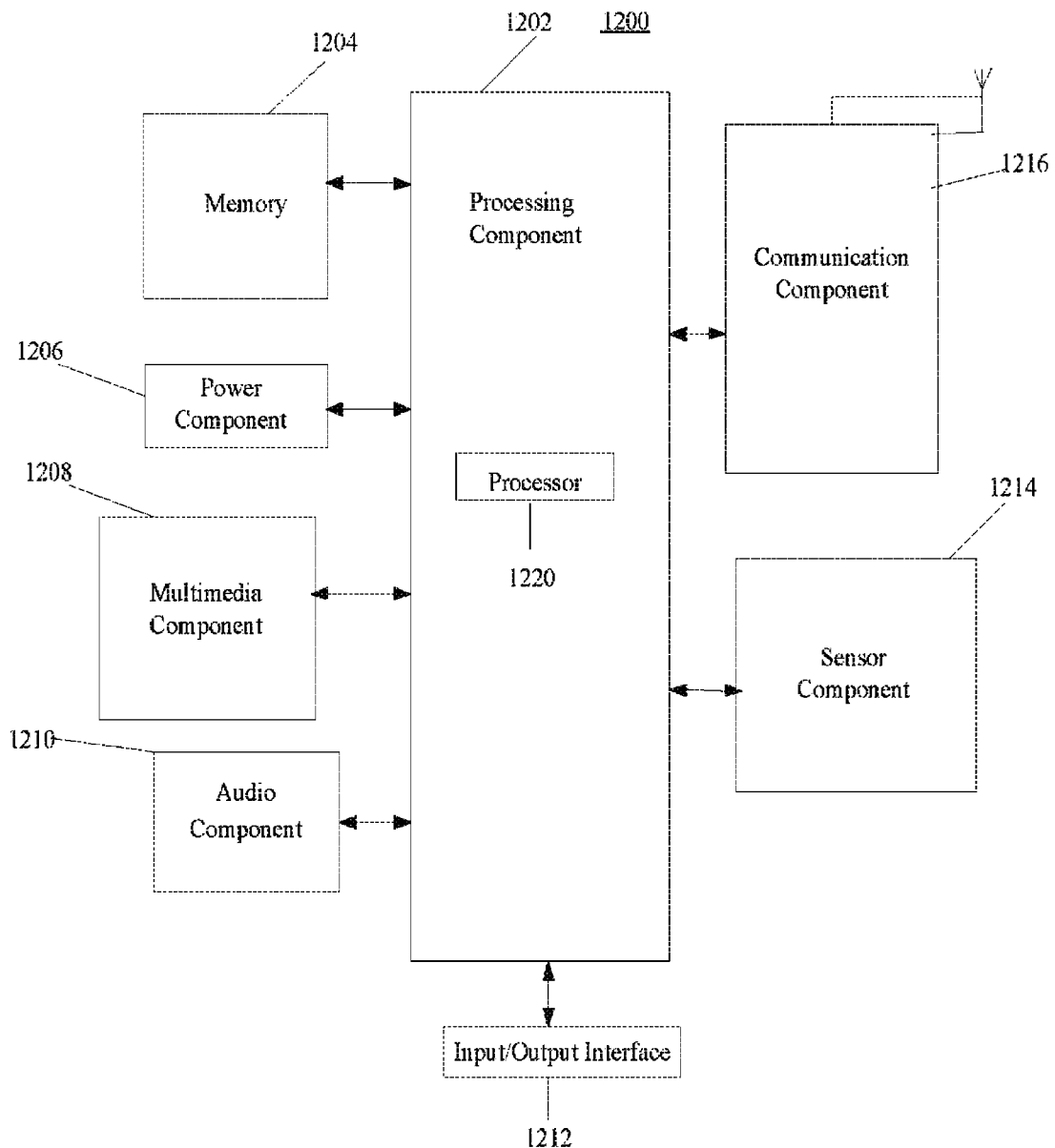
FIG. 16 is a block diagram illustrating a first detecting apparatus according to an exemplary embodiment 6.

FIG. 16 is a block diagram illustrating a detecting apparatus 1200 according to an exemplary embodiment. The apparatus is applicable to a portable device (such as a handset, a tablet computer, a wearable device or the like) having a wireless communication function or to an application in the portable device. For example, the apparatus 1200 may be a computer, a digital broadcast terminal, a messaging device, a gaming console, a tablet device, a medical device, exercise equipment, a personal digital assistant or the like.

Referring to FIG. 16, the apparatus 1200 may comprise one or more of the following components: a processing component 1202, a memory 1204, a power component 1206, a multimedia component 1208, an audio component 1210, an input/output (I/O) interface 1212, a sensor component 1214 and a communication component 1216.

The processing component 1202 typically controls overall operations of the apparatus 1200, such as the operations associated with display, phone calls, data communications, camera operations and recording operations. The processing component 1202 may include one or more processors 1220 to execute instructions to perform all or part of the steps in the above described methods. Moreover, the processing component 1202 may include one or more modules which facilitate the interaction between the processing component 1202 and other components. For example, the processing component 1202 may comprise a multimedia module to facilitate the interaction between the multimedia component 1208 and the processing component 1202.

The memory 1204 is configured to store various types of data to support operations of the apparatus 1200. Examples of such data comprise instructions for any applications or methods operated on the apparatus 1200, contact data, phonebook data, messages, pictures, video, etc. The memory 1204 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the apparatus 1200. The power component 1206 may comprise a power supply management system, one or more power sources, and any other components associated with the generation, management, and distribution of power in the apparatus 1200.

The multimedia component 1208 comprises a screen providing an output interface between the apparatus 1200 and the user. In some embodiments, the screen may comprise a liquid crystal display (LCD) and a touch panel (TP). If the screen comprises the touch panel, the screen may be implemented as a touch screen to receive input signals from the user. The touch panel comprises one or more touch sensors to sense touches, swipes and gestures on the touch panel. The touch sensors may not only sense a boundary of a touch or swipe action, but also sense a period of time and a pressure associated with the touch or swipe action. In some embodiments, the multimedia component 1208 includes a front camera and/or a rear camera. The front camera and/or the rear camera may receive an external multimedia datum while the apparatus 1200 is in an operation mode, such as a photographing mode or a video mode. Each of the front camera and the rear camera may be a fixed optical lens system or have focus and optical zoom capability.

The audio component 1210 is configured to output and/or input audio signals. For example, the audio component 1210 includes a microphone (MIC) configured to receive an external audio signal when the apparatus 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, such as a keyboard, a click wheel, buttons, and the like. The buttons may include, but are not limited to, a home button, a volume button, a starting button, and a locking button.

The sensor component 1214 comprises one or more sensors to provide status assessments of various aspects of the apparatus 1200. For instance, the sensor component 1214 may detect an open/closed status of the apparatus 1200, relative positioning of components, e.g., the display and the keypad, of the apparatus 1200, a change in position of the apparatus 1200 or a component of the apparatus 1200, a presence or absence of user's contact with the apparatus 1200, an orientation or an acceleration/deceleration of the apparatus 1200, and a change in temperature of the apparatus 1200. The sensor component 1214 may include a proximity sensor configured to detect the presence of nearby objects without any physical contact. The sensor component 1214 may also include a light sensor, such as a CMOS or CCD image sensor, for use in imaging applications. In some embodiments, the sensor component 1214 may also include an accelerometer sensor, a gyroscope sensor, a magnetic sensor, a pressure sensor or a temperature sensor.

The communication component 1216 is configured to facilitate communication, wired or wirelessly, between the apparatus 1200 and other devices. The apparatus 1200 can access a wireless network based on a communication standard, such as WiFi, 2G or 3G or a combination thereof. In one exemplary embodiment, the communication component 1216 receives a broadcast signal or broadcast associated information from an external broadcast management system via a broadcast channel. In one exemplary embodiment, the communication component 1216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods.

In an exemplary embodiment, there is also provided a non-transitory computer-readable storage medium comprising instructions, such as comprised in the memory 1204, executable by the processor 1220 in the apparatus 1200, for performing the above-described methods. For example, the non-transitory computer-readable storage medium may be a ROM, a RAM, a CD-ROM, a magnetic tape, a floppy disc, an optical data storage device, and the like.

In an embodiment, there is also provided a detecting apparatus, comprising: a processor; and a memory configured to store instructions executable by the processor. The processor is configured to: search for a target wireless access device located in a target area at a preset frequency according to an instruction; after the target wireless access device is searched out, establish a connection with the target wireless access device; and after the connection with the target wireless access device is established, determine that a user arrives at the target area.

Searching for the target wireless access device located in the target area at the preset frequency according to the instruction comprises: when detecting that the user is about to arrive at the target area, searching for the target wireless access device at the preset frequency.

Searching for the target wireless access device located in the target area at the preset frequency according to the instruction comprises: when detecting that the user is about to arrive at the target area, prompting the user to light a screen; and after receiving an operation instruction of lighting the screen, searching for the target wireless access device at the preset frequency.

Detecting that the user is about to arrive at the target area comprises: searching for a wireless access device around the target area; and if the wireless access device around the target area belongs to a pre-stored list of wireless access devices near the target area, determining that the user is about to arrive at the target area.

Detecting that the user is about to arrive at the target area comprises: sending a broadcast message to a Bluetooth device near the target area via Bluetooth, such that the Bluetooth device returns a response message after receiving the broadcast message, after receiving the response message, determining that the user is about to arrive at the target area.

Detecting that the user is about to arrive at the target area comprises: acquiring the user's position; determining a distance between the user's position and a pre-stored position of the target area when the distance between the user's position and the pre-stored position of the target area is smaller than a predetermined distance, determining that the user is about to arrive at the target area.

After determining that the user arrives at the target area, the method further comprises: performing an operation preset for the user's arrival at the target area.

In an embodiment, there is also provided a non-transitory computer-readable storage medium having stored therein instructions that, when executed by a processor of a detecting apparatus (such as a handset, a wearable device or the like) for detecting a user's arrival home, causes the detecting apparatus to perform a detecting method. The method comprises: searching for a target wireless access device located in a target area at a preset frequency according to an instruction; after the target wireless access device is searched out, establishing a connection with the target wireless access device; after the connection with the target wireless access device is established, determining that the user arrives at the target area.

The instructions stored in the storage medium may cause the detecting apparatus to perform the step of: when detecting that the user is about to arrive at the target area, searching for the target wireless access device at the preset frequency.

The instructions stored in the storage medium may cause the detecting apparatus to perform the steps of: when detecting that the user is about to arrive at the target area, prompting the user to light a screen; and after receiving an operation instruction of lighting the screen, searching for the target wireless access device at the preset frequency.

The instructions stored in the storage medium may cause the detecting apparatus to perform the steps of: searching for a wireless access device around the target area; and if the wireless access device around the target area belongs to a pre-stored list of wireless access devices near the target area, determining that the user is about to arrive at the target area.

The instructions stored in the storage medium may cause the detecting apparatus to perform the steps of: sending a broadcast message to a Bluetooth device near the target area via Bluetooth, such that the Bluetooth device returns a response message after receiving the broadcast message; after receiving the response message, determining that the user is about to arrive at the target area.

The instructions stored in the storage medium may cause the detecting apparatus to perform the steps of: acquiring the user's position; determining a distance between the user's position and a pre-stored position of the target area when the distance between the user's position and the pre-stored position of the target area is smaller than a predetermined distance, determining that the user is about to arrive at the target area.

The instructions stored in the storage medium may further cause the detecting apparatus to perform an operation preset for the user's arrival at the target area.

Figure 17:
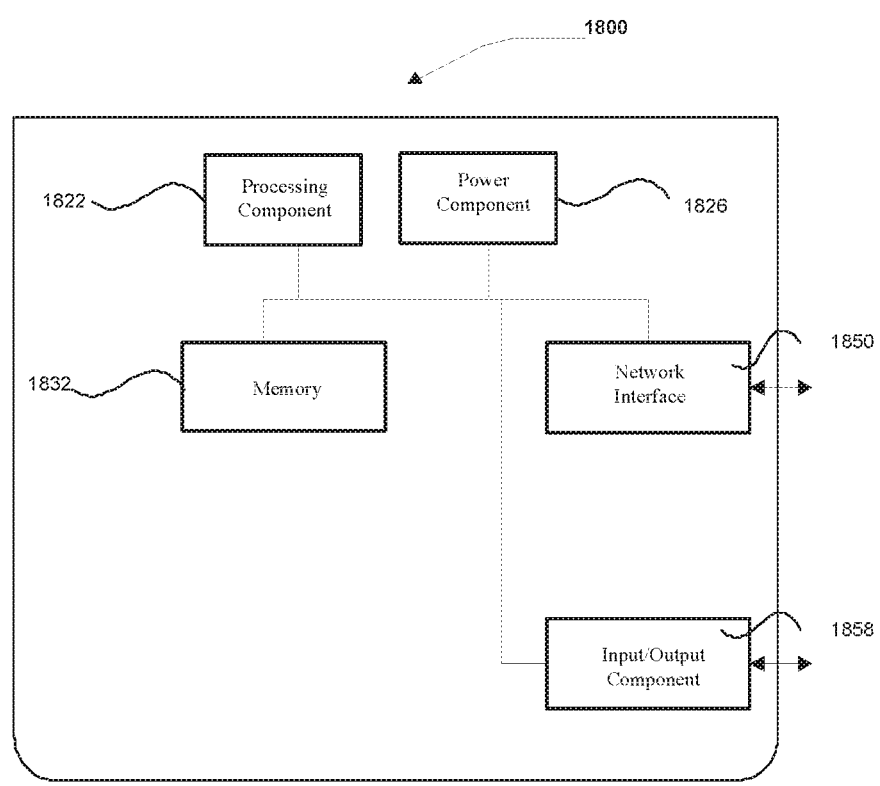
FIG. 17 is a block diagram illustrating a second detecting apparatus according to the exemplary embodiment 6.

FIG. 17 is a second block diagram illustrating a detecting apparatus 1800 according to an exemplary embodiment. For example, the apparatus 1800 may be provided as a server. Referring to FIG. 17, the apparatus 1800 comprises: a processing component 1822 which further comprises one or more processors, and memory resources represented by a memory 1832 for storing instructions executable by the processing component 1822, such as applications. The applications stored in the memory 1832 may comprise one or more modules, each corresponding to a set of instructions. In addition, the processing component 1822 is configured to execute instructions to perform the above detecting method.

The apparatus 1800 may further comprise a power component 1826 configured to perform power supply management of the apparatus 1800, a wired or wireless network interface 1850 configured to connect the apparatus 1800 to a network and an input/output component 1858. The apparatus 1800 may operate an operating system stored in the memory 1832, such as Windows Server™, Mac OS X™, Unix™, Linux™, FreeBSD™ or the like.

The apparatus provided by this embodiment of the present disclosure may produce the following advantageous effect. By searching for a target wireless access device at a preset frequency and by determining that a user arrives at a target area after establishing a connection with the target wireless access device searched out, the target wireless access device can be searched out in time and a communication connection therewith can be established. Once the connection is established successfully, it is determined that the user arrives at the target area, so that the user's arrival at the target area can be detected more accurately.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A method for detecting an arrival of a user in a target area, comprising:
   detecting that the user is within a proximity to the target area;
   searching, by a device belonging to the user, for a target wireless access device located in the target area at a preset frequency, wherein the preset frequency is set in association with a predetermined scenario and corresponds to a number of search operations performed per unit time;
   when the target wireless access device is found, establishing a connection with the target wireless access device; and
   after the connection with the target wireless access device is established, determining that the user arrives at the target area.

2. The method of claim 1, wherein searching for the target wireless access device located in the target area at the preset frequency comprises:
   prompting the user when the user is within the proximity to the target area;
   receiving an instruction from the user to search for the target wireless access device; and
   searching for the target wireless access device at the preset frequency in response to the instruction.

3. The method of claim 1, wherein searching for the target wireless access device located in the target area at the preset frequency comprises:
   prompting the user to perform an activation operation associated with an instruction to search for the target wireless access device;
   detecting the activation operation that is performed on the device; and
   searching for the target wireless access device at the preset frequency when the activation operation is detected.

4. The method of claim 1, wherein detecting that the user is within the proximity to the target area comprises:
   detecting a wireless access device; and
   when the detected wireless access device is in a pre-stored list of wireless access devices near the target area, determining that the user is within the proximity to the target area.

5. The method of claim 1, wherein detecting that the user is within the proximity to the target area comprises:
   sending a broadcast message according to a Bluetooth wireless communication standard;
   when a response message from a Bluetooth device near the target area is received in response to the broadcast message, determining that the user is within the proximity to the target area.

6. The method of claim 1, wherein detecting that the user is within the proximity to the target area comprises:
   acquiring the user's position;
   determining a distance between the user's position and a pre-stored position of the target area;
   when the distance between the user's position and the pre-stored position of the target area is smaller than a predetermined distance, determining that the user is within the proximity to the target area.

7. The method of claim 1, wherein after determining that the user arrives at the target area, the method further comprises:

performing an operation preset for the user's arrival at the target area.

8. A detecting apparatus, comprising:
a processor; and
a memory configured to store instructions executable by the processor,
wherein the processor is configured to:
  detect that the user is within a proximity to the target area,
  search for a target wireless access device located in the target area at a preset frequency, wherein the preset frequency is set in association with a predetermined scenario and corresponds to a number of search operations performed per unit time;
  when the target wireless access device is found, establish a connection with the target wireless access device; and
  after the connection with the target wireless access device is established, determine that a user who owns the detecting apparatus arrives at the target area.

9. The detecting apparatus of claim 8, wherein the processor is configured to:
  prompt the user to perform an activation operation associated with an instruction to search for the target wireless access device when the user is within the proximity to the target area;
  detect the activation operation on the detecting apparatus; and
  search for the target wireless access device at the preset frequency when the activation operation is detected.

10. The detecting apparatus of claim 8, wherein the processor is configured to:
  detect a wireless access device; and
  when the detected wireless access device is in a pre-stored list of wireless access devices near the target area, determine that the user is within the proximity to the target area.

11. The detecting apparatus of claim 8, wherein the processor is configured to:
  send a broadcast message according to a Bluetooth wireless communication standard;
  when a response message from a Bluetooth device near the target area is received in response to the broadcast message, determine that the user is within the proximity to the target area.

12. The detecting apparatus of claim 8, wherein processor is configured to:
  acquire the user's position;
  determine a distance between the user's position and a pre-stored position of the target area;
  when the distance between the user's position and the pre-stored position of the target area is smaller than a predetermined distance, determine that the user is within the proximity to the target area.

13. A non-transitory computer-readable storage medium having stored therein instructions that, when executed by a processor of a mobile terminal, causes the mobile terminal to perform operations for detecting an arrival of a user who owns the mobile terminal in a target area, the operations comprising:
  detecting that the user is within a proximity to the target area;
  searching for a target wireless access device located in the target area at a preset frequency, wherein the preset frequency is set in association with a predetermined scenario and corresponds to a number of search operations performed per unit time;
  when the target wireless access device is found, establishing a connection with the target wireless access device; and
  after the connection with the target wireless access device is established, determining that the user arrives at the target area.

* * * * *